United States Patent [19]

Miller et al.

[11] Patent Number: 4,524,702

[45] Date of Patent: Jun. 25, 1985

[54] READILY REPAIRABLE AND LIGHTWEIGHT COVER FOR A HEATED VESSEL

[75] Inventors: Thomas M. Miller, North Olmsted; Raymond J. Schraff, Cleveland; Nicholas Labas, Solon, all of Ohio

[73] Assignee: Eltech Systems Corporation, Boca Raton, Fla.

[21] Appl. No.: 635,441

[22] Filed: Jul. 30, 1984

[51] Int. Cl.[3] ........................ E04B 1/80; C04B 43/02; F23M 7/00

[52] U.S. Cl. ................................ 110/173 A; 432/248; 432/250; 110/331; 110/336; 52/506; 266/280

[58] Field of Search .................. 110/173 A, 336, 331, 110/332; 432/248, 250; 52/506; 266/280

[56] References Cited

U.S. PATENT DOCUMENTS

| | | | |
|---|---|---|---|
| 3,853,077 | 12/1974 | Malovich | 432/250 |
| 3,854,262 | 12/1974 | Brady | 110/173 A |
| 4,287,839 | 9/1981 | Severin et al. | 110/331 |
| 4,381,634 | 5/1983 | Hounsel et al. | 110/336 |
| 4,411,621 | 10/1983 | Miller | 432/247 |
| 4,440,099 | 4/1984 | Brachet et al. | 110/336 |
| 4,449,345 | 5/1984 | Hounsel et al. | 110/336 |

*Primary Examiner*—Henry C. Yuen

*Attorney, Agent, or Firm*—John J. Freer

[57] ABSTRACT

A lightweight cover provides heat insulation for a heated vessel such as a soaking pit. The cover can be readily assembled in a manner providing for ease of repair plus simplicity of maintenance. The cover has a pair of opposing frame members with ceramic fiber insulation positioned therebetween. The insulation is secured in movable engagement such as a draped and swinging engagement. In this mode, compression can be exerted against the insulation to most desirably reduce heat loss otherwise caused by heat induced ceramic fiber shrinkage. Moreover, with this structure a ceramic fiber heat seal can be achieved around edges of the soaking pit.

11 Claims, 2 Drawing Figures

READILY REPAIRABLE AND LIGHTWEIGHT COVER FOR A HEATED VESSEL

BACKGROUND OF THE INVENTION

It has been traditional to line heated vessels such as soaking pit covers with dense fire brick linings. Such linings however, are sensitive to thermal shock which can severely limit the lifetime of the lining. It has therefore been more recently proposed to line soaking pit covers with fibrous refractory insulating materials. For example, it has been proposed in U.S. Pat. No. 3,854,262 to arrange strips of ceramic fiber blankets into compressed panels by means of metallic parts buried in the blanket material exerting compressive pressure on the material. At the portion of the panel away from this internally exerted compression, the fibrous blanket strips will tend to "blouse", so that on the furnace side of the soaking pit lid there will be a continuous protection of insulating material.

As opposed to such strips of fibrous blanket material, it has also been proposed to employ a series of interlocking U-shaped mats. By the interlocking of the mats of such shape, heat path leakage can be reduced or even eliminated. Such leakage across the more traditional fire brick linings tended to fracture the refractory brick and/or the mortared joints between the brick. The utility of such a structure for soaking pit covers has been discussed in U.S. Pat. No. 4,411,621. Therein, it has been more specifically shown to support the fibrous mats by securing them to a metal mesh cover, such as by wire ties.

More recently, in U.S. patent application Ser. No. 602,197, it has been proposed that a cover such as for a furnace or soaking pit contain a series of U-shaped blankets in side-by-side relationship. These blankets serve as the principle covering elements, and may be supported by hangers slideably engaging a support bar. By means of this structure, compression exerted against an end blanket can be transmitted across the covering of the blanket elements by virtue of the sliding hanger arrangement. Moreover, the hangers can be sized to provide for limiting the maximum degree of sliding, or compression, of the covering blankets.

It would, however, be most desirable to assemble a cover structure that overcomes the disadvantages of fire brick linings and offers the advantages of ceramic fiber insulation, while commensurately providing a structure not only of great ease of assembly, but also ease of repair. It would also be most desirable that such structure have the facility of blanket compression, without inducing deleterious degradation of fiber blanket integrity during compression. It would furthermore be advantageous if such cover structure was most lightweight and could be readily placed upon and removed from the soaking pit.

SUMMARY OF THE INVENTION

Such objects have now been accomplished by means of the present invention. A lightweight cover is now provided which features ease of assembly. Moreover, the cover is particularly adapted for ease of disassembly and repair. The cover is lightweight, yet durable. By being compressible, it can withstand elevated vessel pressures, while achieving a cooler cold face for enhanced insulation. The cover can accommodate uneven soaking pit surfaces, in part through twist flexing of the cover. Yet the cover is a single, integrated unit which can provide a ceramic fiber insulation seal around all edges of a soaking pit.

The present invention is thus particularly directed to a lightweight insulation cover structure for retaining heat in a heated vessel such as in a soaking pit, which cover structure has a ceramic fiber insulation hot face under a supporting frame having only one pair of outer frame members, the frame members being spaced apart in opposing relationship one from the other, and with the ceramic fiber insulation being positioned between the pair of opposing frame members by linking means connecting the insulation with the supporting frame in upwardly moveable and at least substantially swinging engagement, whereby the insulation is free-floating under the frame.

Another important aspect of the present invention is directed to the positioning of frame members to permit twist flexing of the supporting frame. A still further important aspect of the present invention includes adjustable insulation compression means which, when set, can be maintained in place in locked position.

DESCRIPTION OF THE PREFERRED EMBODIMENTS

Ceramic fiber insulation will be useful for purposes of the present invention so long as it is available in some form-stable condition, i.e., as opposed to merely loose fibers. To provide form-stable condition, it can be expected that individual fibers will have been brought together in matrix form, such as by felting or weaving operation or the like. When in such form, the insulation can be supplied in units. For convenience, individual ceramic fiber insulating units will generally be referred to herein as "blankets", but it is to be understood that the words "batts" and "mats" may also be used to refer to such units. By use of the term ceramic fiber "module", reference is being made to a unit of interengaged blankets, such as prepared by stitching together adjacent blankets or by interengaging such blankets by inner support means.

The heated vessel for which the cover will find use can be generally any such vessel wherein a planar, or at least substantially planar, cover will be useful, e.g., as with a soaking pit. The vessel may be heated by means such as forced air convection heating as well as by containing hot solid metal, e.g., one or more steel ingots. In general, the ceramic fiber insulation filler in the cover will be useful at interior cover temperatures on the order of 2500° F. or even greater. Thus the cover is contemplated for use such as with furnaces, tundishes or as ladle covers where the cover can withstand such temperatures as well as the positive pressures associated with heating means such as forced air means. In commercial practice, use of the invention for the covering of vessels containing aluminum and iron, including steel such as stainless steel, is most contemplated. Moreover, the cover will necessarily be most serviceable over vessels such as soaking pits wherein a fiber seal around the edge as well as elevation adjustment members of the covers can be best employed in covering the vessel. Thus, reference herin will usually be made to a cover for a soaking pit, although it is to be understood that such references will be most always only made for convenience and not in a manner limiting the invention.

Figure 1:
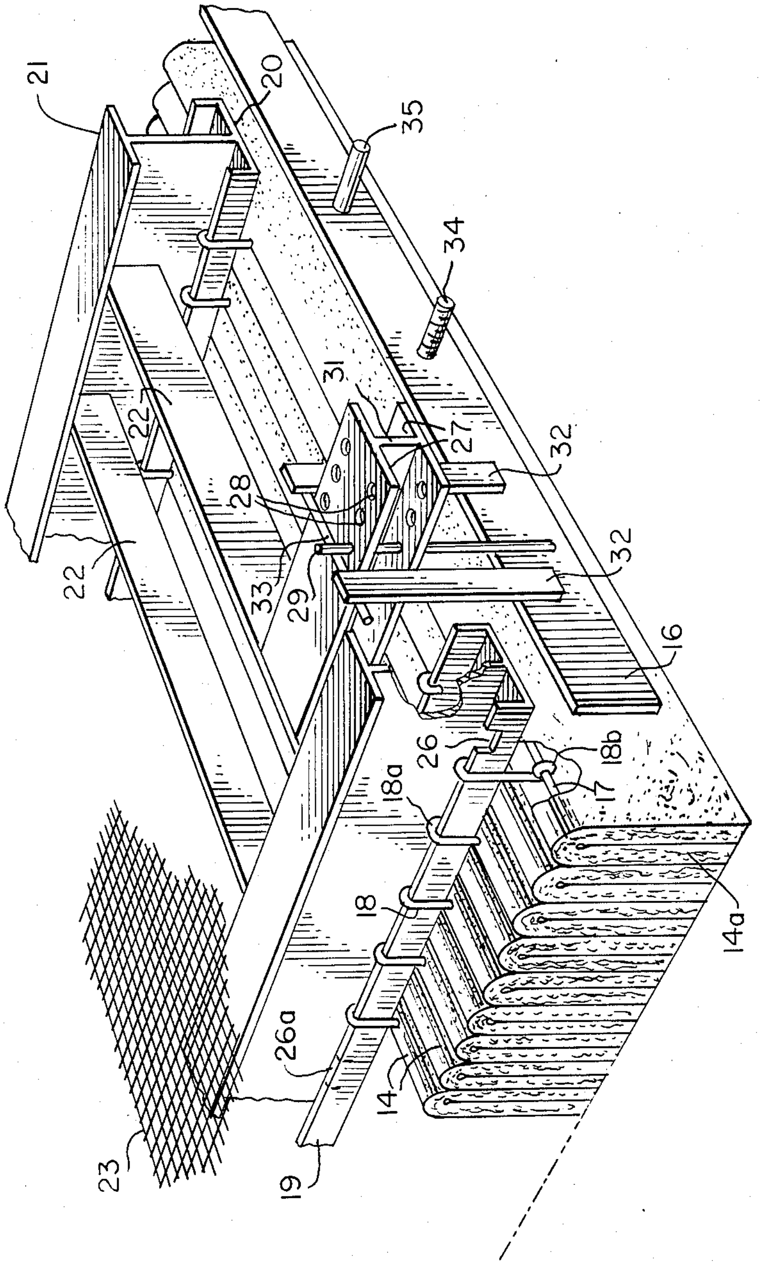
FIG. 1 is a perspective view in partial section of a corner portion of a vessel cover with frame member removed.

Referring now in greater detail to the drawings, FIG. 1 is a perspective view in partial section of a corner portion of a soaking pit cover, with the frame member removed thereby exposing a compression plate 16 which abuts up against a series of U-shaped cover blankets 14. Each of the U-shaped cover blankets 14 has a pair of depending blanket legs **14*a*. A reinforcing bar 17 is retained within the fold of each U-shaped cover blanket 14. To each reinforcing bar 17 there are attached wire clips 18 which pierce through the cover blanket 14 and terminate upwardly in a wire hook 18*a*. Each wire clip 18 has a tail section 18*b* within the blanket 14, which tail section 18*b* loops around the reinforcing bar 17. Each wire hook 18*a* rides over an upright edge 19 of a bottom flange 20 of an insulation support member 21. By means of this hooking arrangement, the blankets 14 can move into snug side-by-side relationship under force exerted from the compression plate 16. Also, the blankets 14 and hooks 18*a* can move upwardly when the blankets 14 are at rest, e.g., on the edge of a soaking pit, not shown. Affixed between the support members 21 are the stiffeners 22 which lend reinforcement to the support members 21. Overhead, a readily removable metal mesh 23 covers the stiffeners 22**.

The upright edge 19 of the bottom flange 20 of the support member 21 contains an end splice 26 as well as other, filled, splice sections **26*a*. The end splice 26 provides an aperture in the upright edge 19 whereby the wire hooks 18*a* of the clips 18 can be inserted in, or removed from, the upright edge 19. The filled splice section 26*a* are similarly useful, e.g., during construction of the cover assembly. Extending from the support member 21 and from the stiffener 22 nearest the compression plate 16, are a pair of positioning plates 27 spaced apart by a plate spacer 31. Each positioning plate 27 contains a multitude of apertures 28. When the compression plate 16 is compressed into position against the cover blankets 14, a locking pin 29 is inserted in the apertures 28 nearest the outer face of the compression plate 16 whereby the lower section of the locking pin 29 abuts firmly against the outer surface of the compression plate 16 and maintains the compression plate 16** in locked position. Such locking arrangement assures maintenance of at least the locking position compression regardless of involvement from the compression actuating means, not shown.

Astride the positioning plates 27 and affixed to the compression plate 16 are upwardly projecting support legs 32. These legs 32 are interconnected at their top by a support bar 33 which rests on the upper surface of the top positioning plate 27. By such means, the compression plate 16 is supported as well as having freedom to move, when compression is exerted or relaxed, by means of the support bar 33 movement across the top positioning plate 27 surface. Also, the compression plate 16 has threaded pins 34 through which pressure is exerted on the compression plate, by means not shown. Furthermore, the compression plate 16 may contain guide pins 35 which project through holes in the adjacent frame member, not shown, and guide as well as support the compression plate 16. Such guide pins 35 are optional where a compression plate 16 is supported by a support bar 33 atop a pair of support legs 32.

Figure 2:
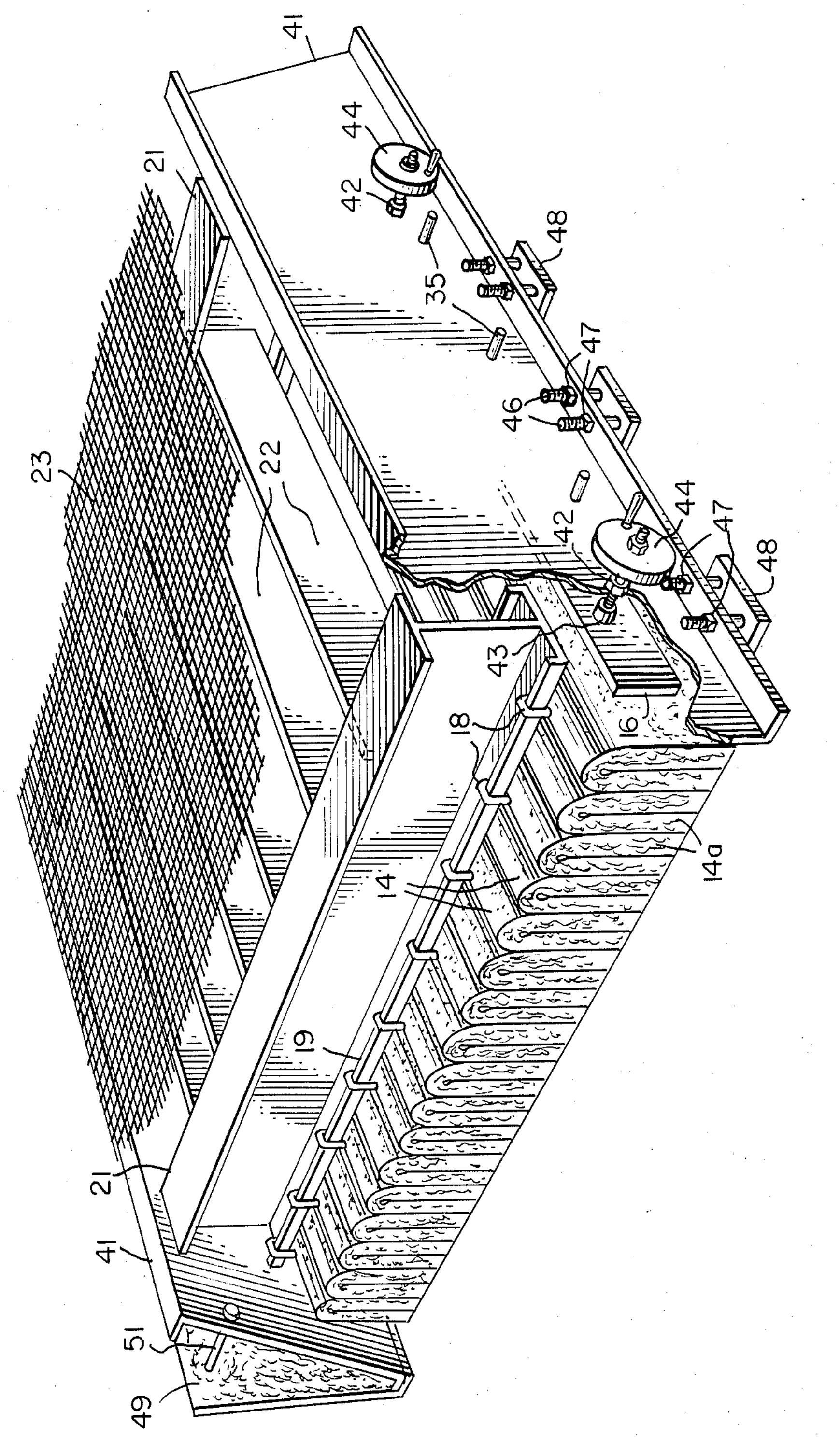
FIG. 2 is a cross-sectional elevational view of a vessel cover especially useful as a soaking pit cover constructed in accordance with the present invention.

Referring now more particularly to FIG. 2, a series of cover blankets 14 are again depicted depending by wire hooks **18*a* from support members 21. The support members 21 are fastened, as by welding, at each end to a frame member 41. Behind the frame member 41, as shown by partial section, is a compression plate 16. Protruding from the compression plate 16 and through the frame member 41 are the guide pins 35. Also projecting from the compression plate 16 are threaded rods 42 that likewise project, by means of threaded apertures, through the frame member 41. The threaded rods 42 abut against the compression plate 16 within collars 43. By means of a turn plate 44, the threaded rods 42 can be screwed through the threaded sections of the frame member 41 and thereby exert pressure against the compression plate 16**.

Through threaded holes in the bottom flange 45 of the frame member 41 there are inserted threaded posts 46 which terminate downwardly through nuts 47 in a foot 48. The combination of the foot 48 with the threaded posts 46 provides for elevation adjustment of the frame member 41. Atop the stiffeners 22, is a metal mesh cover 23, shown in partial section. At one end, the frame member 41 is equipped with a heat shield 49 connected to the frame member 41 by fastening means 51.

As can be seen by referring again to FIG. 1, in assembling the cover assembly the wire hooks **18*a* can be slipped onto the upper edges 19 at the end splice 26 or splice sections 26*a*. The splice sections 26*a* can then be closed after assembly, such as by welding. After use, and for repair, damaged individual cover blankets 14 can be readily removed by merely cutting through the wire clips 18 thereby facilitating removal of individual cover blankets 14 from their supporting wire hooks 18*a*. Fresh cover blankets 14 can then be inserted in place. The wire clips 18 used during insertion can be straightened and then the top sections can be bent into the wire hooks 18*a* to complete installation. Alternatively, pressure can be relaxed on the compression plate 16, and a fresh cover blanket 14 with wire hooks 18*a* in place, can be slipped as an end cover blanket 14 through the end splice 26**.

The wire hooks **18*a* will not only provide for movement of the cover blankets 14 along the upright edge 19 of the support members 21 where the blankets 14 are under compression, but also such wire hooks 18*a* can move upwardly as the cover assembly is positioned in place. By this freedom of movement, the cover blankets 14 can "free-float" onto the soaking pit aperture and thereby individual cover blankets 14 can contact the edge of such aperture, compensating even for irregularities in the edge surface. It is preferred that the wire hooks 18*a*, tail sections 18*b* and the upright edges 19 be so dimensioned that as the cover blankets 14 free-float in position, the hooks 18*a* are not pushed sufficiently upwardly to disengage from the upright edge 19. Assisting in the covering of the soaking pit aperture, in addition to the free-floating of the cover blankets 14 is the reticulated structure of the frame assembly. Such structure, although firm, nevertheless permits slight twisting and flexing of the overall frame assembly. It can be appreciated that the number of stiffeners 22, and spacing between individual stiffeners 22, as well as similar considerations for the support members 21**, can be adjusted to accommodate the degree of the twisting and flexing for the frame assembly.

Although it need not be the case, it is desirable for thread maintenance, that the weight of the compression plate 16 as well as its positioning, be supported and maintained by the guide pins 35. Other structure is however contemplated, whereby the threaded rods 42 can be replaced by spring loaded rods. However with the preferred arrangement the threaded rods 42 need only abut against the compression plate 16 and be positioned within the collars 43 on the compression plate 16. Each foot 47 of each adjustment element can be useful in providing for the drape of the cover blankets 14 to project below not only the frame member 41 but also such feet 47. They can also be adjusted to compensate for irregularities in the edge around the soaking pit aperture. Moreover, the compression plate 16 can have flexibility to compress the cover blankets 14 to a greater distance at their center, rather than at their generally cooler edges, and thus "bow" the plate 16 at its center. Alternatively, the plate 16 can be segmented to allow for varying pressure adjustment along the plate 16.

A variety of ceramic fiber insulation filler structures may be employed. For example, in addition to such being U-shaped as shown, they can take other shapes, e.g., S-shaped or W-shaped. Also, it is preferred that the wire clips 18 on each upright edge 19 be projecting from alternate folds, as shown in the figures. Thus, an individual fold of a cover blanket 14 will contain a wire clip 18 at one upright edge 19 or the other of each support member 21, but not at both of the edges 19. This preferred structure prevents bunching of wire clips 18 during compression of the cover blankets 14.

It is to be understood that the compression plate 16, end splice 26, locking pins 29 and so forth as depicted in the figures can be present in association with each of the pair of frame members 41. This need not, however, be the case. Thus, for example, one frame member 41 may simply have spaced inwardly apart from the frame member 41 a plate which may be a compression plate 16 or a fixed plate whereby compression is exerted only with reference to the assembly adjacent the other, opposing frame member 41. Moreover, even where the same assemblies are used in conjunction with each frame member 41, compression may be exerted only from one end, whereby the gap between a compression plate 16 and its adjacent frame member 41 may be of extended magnitude, e.g., a foot or so, whereas at the opposite frame member 41, such gap may be considerably less, e.g., a half foot or less.

Each of the frame members 41, support members 21 and stiffeners 22 can be a rolled channel or similar metal material. Moreover, the metal mesh cover 23 can be of other covering grid material, or such cover need not be used. For providing that the cover 23 be readily removable and thus facilitate ease of repair, the cover 23 may simply rest on the stiffeners 22.

Where a heat shield 49 is employed, and such can be an optional feature, it will be affixed to the frame member 41 at the end of the cover assembly which will be nearest the soaking pit when the assembly has been removed from the pit. Suitable materials of construction for the heat shield 49 include ceramic fiber insulation material. Also, the frame members 41, support members 21 and stiffeners 22 can be suitably treated, e.g., painted with a heat reflecting paint.

Referring again to FIG. 2, it will be seen that as the cover assembly is being lowered over a soaking pit, typically by means of a crane hooked to a cover assembly lifting bale, not shown, as the cover blankets 14 are coming to rest around the edge of the soaking pit, such blankets 14 will be free to move upwardly. This movement will cause upward movement of the wire hooks 18*a* along the upright edges 19. As the cover assembly is being set into place, the feet 47 of the elevation adjustment assemblies will likewise be coming to rest in the floor area adjacent the edge of the soaking pit after the cover blankets 14 have initially engaged the edge of the soaking pit. Upon placement of the cover assembly over the soaking pit aperture, the crane hook can be disengaged from the lifting bale, not shown.

Generally, the frame members 41, support members 21 and stiffeners 22 are metal members which are welded together. All other members, other than the cover blankets and heat shield 49 are preferably likewise metallic.

We claim:

1. A lightweight insulation cover structure for retaining heat in a heated vessel, said cover structure having a ceramic fiber insulation hot face, which cover structure comprises:

- a pair of opposing, outer frame members spaced sufficiently apart one from the other for positioning each member at opposite ends beyond the opening of said vessel;
- a series of parallel cover support members spanning said vessel opening, spaced apart from each other and located transversely between said frame members as well as being affixed thereto;
- a plurality of depending ceramic fiber insulation units, each in form-stable condition positioned under said cover support members;
- insulation support means in interengagement with said depending insulation;
- linking means connecting said insulation support means with said cover support members in upwardly moveable and at least substantially swinging engagement; and
- adjustable compression means abutting against said depending insulation.

2. The insulation cover of claim 1, wherein said ceramic fiber insulation is present in matrix form as unit structures including individual, folded units draped between said frame members as a series of parallel, side-by-side units in snug relationship one with the other.

3. The insulation cover of claim 2, wherein said compression means abuts against a depending leg of a folded ceramic fiber insulation unit in a direction transverse to the unit fold.

4. The insulation cover of claim 1, wherein said metal cover support members have sufficient spacing between adjacent support members to accommodate twist flexing of said cover.

5. The insulation cover of claim 1, wherein said frame members each contain elevation adjustment means having a depending element terminating downwardly in a supporting foot.

6. The insulation cover of claim 1, wherein said cover support members each have an assembly splice section.

7. The insulation cover of claim 1, wherein at least one of said frame members is present in combination with a heat shield facing away from said heated vessel.

8. The insulation cover of claim 1, wherein said support means are linked by wire hooks with said frame means in upwardly moveable and swinging engagement.

9. The insulation cover of claim 1, wherein compression is exerted against said depending insulation from a compression plate abutting against said fiber insulation and containing guide means in interengagement with an adjacent frame member.

10. The insulation cover of claim 1, wherein a foraminous metal covering is secured over said cover support members.

11. The insulation cover of claim 10, wherein said foraminous covering is a metal mesh covering.

* * * * *